United States Patent
Upton (10) Patent No.: US 9,135,036 B2
(45) Date of Patent: Sep. 15, 2015

(54) METHOD AND SYSTEM FOR REDUCING COMMUNICATION DURING VIDEO PROCESSING UTILIZING MERGE BUFFERING

(75) Inventor: Eben Upton, Cambridge (GB)

(73) Assignee: Broadcom Corporation, Irvine, CA (US)

(*) Notice: Subject to any disclaimer, the term of this patent is extended or adjusted under 35 U.S.C. 154(b) by 849 days.

(21) Appl. No.: 12/686,800

(22) Filed: Jan. 13, 2010

(65) Prior Publication Data

US 2011/0154377 A1    Jun. 23, 2011

Related U.S. Application Data

(60) Provisional application No. 61/287,269, filed on Dec. 17, 2009.

(51) Int. Cl.
  *G06F 3/00*  (2006.01)
  *G06F 9/455*  (2006.01)
  *G06F 9/54*  (2006.01)

(52) U.S. Cl.
  CPC ............ *G06F 9/45533* (2013.01); *G06F 9/544* (2013.01)

(58) Field of Classification Search
  None
  See application file for complete search history.

(56) References Cited

U.S. PATENT DOCUMENTS

| 5,854,637 | A  | * | 12/1998 | Sturges ......................... 345/542 |
| 6,337,689 | B1 | * | 1/2002  | Hochmuth et al. ........... 345/522 |
| 7,284,262 | B1 | * | 10/2007 | Meric et al. .................... 725/142 |
| 2006/0123400 | A1 | * | 6/2006  | Burdick et al. ............... 717/130 |
| 2008/0276252 | A1 | * | 11/2008 | Pronovost et al. ............ 719/318 |
| 2008/0303835 | A1 | * | 12/2008 | Swift et al. .................... 345/522 |

* cited by examiner

*Primary Examiner* — Sisley Kim
(74) *Attorney, Agent, or Firm* — Brinks Gilson & Lione (57) ABSTRACT

Methods and systems for reducing communication during video processing utilizing merge buffering are disclosed and may include storing data in a merge buffer in the virtual machine layer in a wireless communication device comprising a virtual machine user layer, a native user layer, a kernel, and a video processor. The data may then be communicated to the kernel via the native user layer. The data may include function calls, and/or kernel remote procedure calls. The data may be communicated via an application programming interface. Video data may be processed in the video processor based on the communicated data. The virtual machine user layer may include a Java environment. The data may be communicated to the kernel via the native user layer when the merge buffer is full or filled to a predetermined level.

27 Claims, 5 Drawing Sheets

METHOD AND SYSTEM FOR REDUCING COMMUNICATION DURING VIDEO PROCESSING UTILIZING MERGE BUFFERING

CROSS-REFERENCE TO RELATED APPLICATIONS/INCORPORATION BY REFERENCE

This application makes reference to, claims the benefit from, and claims priority to U.S. Provisional Application Ser. No. 61/287,269 filed on Dec. 17, 2009.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to data processing. More specifically, certain embodiments of the invention relate to a method and system for reducing communication during video processing utilizing merge buffering.

BACKGROUND OF THE INVENTION

Cellular phones have developed from large, expensive devices typically used only in cars and owned only by a small percentage of the population to miniature, inexpensive, and ubiquitous handheld devices, and are even more numerous than traditional land-line phones in countries with poor fixed-line infrastructure. Cellular handsets have incorporated text messaging, email, connection to the Internet, PDAs, and even personal computers.

Cellular phones with built-in cameras, or camera phones, have become prevalent in the mobile phone market, due to the low cost of CMOS image sensors and the ever increasing customer demand for more advanced cellular phones. As camera phones have become more widespread, their usefulness has been demonstrated in many applications, such as casual photography, but have also been utilized in more serious applications such as crime prevention, recording crimes as they occur, and news reporting.

Historically, the resolution of camera phones has been limited in comparison to typical digital cameras, due to the fact that they must be integrated into the small package of a cellular handset, limiting both the image sensor and lens size. In addition, because of the stringent power requirements of cellular handsets, large image sensors with advanced processing have been difficult to incorporate. However, due to advancements in image sensors, multimedia processors, and lens technology, the resolution of camera phones has steadily improved rivaling that of many digital cameras.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for reducing communication during video processing utilizing merge buffering, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for reducing communication during video processing utilizing merge buffering. Exemplary aspects of the invention may comprise storing data in a merge buffer in a virtual machine user layer in a wireless communication device. The wireless communication device may comprise the virtual machine user layer, a native user layer, a kernel, and a video processor. The stored data may be communicated to the kernel via the native user layer. The stored data may be communicated to the kernel utilizing function calls, and/or kernel remote procedure calls. An application programming interface may be utilized to communicate the stored data to the kernel. Video data may be processed by the video processor based on the communicated data. The virtual machine user layer may comprise a Java environment. The data may be communicated to the kernel via the native user layer when the merge buffer is full or reaches a dynamically or statically determined level.

Figure 1A:
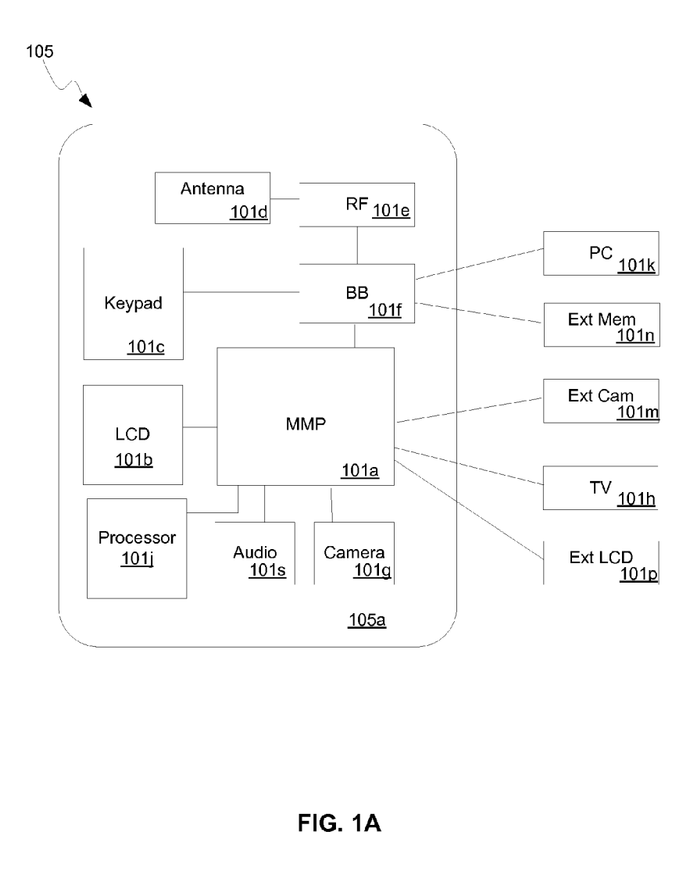
FIG. 1A is a block diagram of an exemplary mobile multimedia system that utilizes a merge buffer, in accordance with an embodiment of the invention.

FIG. 1A is a block diagram of an exemplary mobile multimedia system that utilizes a merge buffer, in accordance with an embodiment of the invention. Referring to FIG. 1A, there is shown a mobile multimedia system 105 that comprises a mobile multimedia device 105a, a TV 101h, a PC 101k, an external camera 101m, external memory 101n, and external LCD display 101p. The mobile multimedia device 105a may be a cellular telephone or other handheld communication device. The mobile multimedia device 105a may comprise a mobile multimedia processor (MMP) 101a, an antenna 101d, an audio block 101s, a radio frequency (RF) block 101e, a baseband processing block 101f, an LCD display 101b, a keypad 101c, and a camera 101g.

The MMP 101a may comprise suitable circuitry, logic, interfaces, and/or code that may be operable to perform video and/or multimedia processing for the mobile multimedia device 105a. The MMP 101a may also comprise integrated interfaces, which may be utilized to support one or more external devices coupled to the mobile multimedia device 105a. For example, the MMP 101a may support connections to a TV 101h, an external camera 101m, and an external LCD display 101p.

The processor 101J may comprise suitable circuitry, logic, interfaces, and/or code that may be operable to control processes in the mobile multimedia system 105. Although not shown in FIG. 1A, the processor 101J may be coupled to a plurality of devices in and/or coupled to the mobile multimedia system 105.

In operation, the mobile multimedia device may receive signals via the antenna 101d. Received signals may be processed by the RF block 101e and the RF signals may be converted to baseband by the baseband processing block 101f. Baseband signals may then be processed by the MMP 101a. Audio and/or video data may be received from the external camera 101m, and image data may be received via the integrated camera 101g. During processing, the MMP 101a may utilize the external memory 101n for storing of processed data. Processed audio data may be communicated to the audio block 101s and processed video data may be communicated to the LCD 101b and/or the external LCD 101p, for example. The keypad 101c may be utilized for communicating processing commands and/or other data, which may be required for audio or video data processing by the MMP 101a.

In an embodiment of the invention, the MMP 101A may be operable to process video signals received wirelessly or generated by an imaging sensor, such as the external camera 101m or the camera 101g, for example. The MMP 101a may process video signals within a plurality of video modules, as described further with respect to FIG. 1B.

In an embodiment of the invention, the processor 101J may be operable to configure a virtual machine (VM) layer within an operating system, such as a Java or Microsoft common language runtime (CLR) environment. In addition, the processor 101J may support a native user layer comprising application and library domains, which may interact with the VM layer. The native user layer may communicate with hardware within the processor 101j and the MMP 101a via a kernel remote procedure call (RPC) within the processor 101j operating system.

In general, the user layer may also comprise implementations of various other standard and third-party APIs such as the Java MIDP (mobile information device profile). An application programming interface (API) such as open graphics library (GL) 3D may be utilized for video processing in the MMP 101a, and accessed by the user domain.

Communication between the VM layer and hardware via the kernel RPC may be costly in terms of latency, time, and power, for example. In an embodiment of the invention, commands to be communicated from the VM layer to hardware, such as the MMP 101a, may be buffered in a merge buffer in the VM layer, such that commands may be communicated out of the buffer when full, or at a desired level, such that more efficient use of the kernel RPC may be enabled. The merge buffer may comprise memory registers in the processor 101j, for example. This is described further with respect to FIGS. 3 and 4.

In an embodiment of the invention, the VM environment may comprise the client-side implementation of the graphics API, such as OpenGL ES or OpenVG, for example. For each function defined by the API specification, there may be a function with an appropriate name that may pack the function arguments into the merge buffer and optionally trigger transmission of the merge buffer to the native code and subsequently to the kernel and the video processor. For a small number of functions there may also be code that is executed in order to retrieve a return value from the video processor via the kernel and native code, or to store away parameter values which are only meaningful in the user layer, such as vertex attribute pointers for example, which may be used when processing future calls.

Figure 1B:
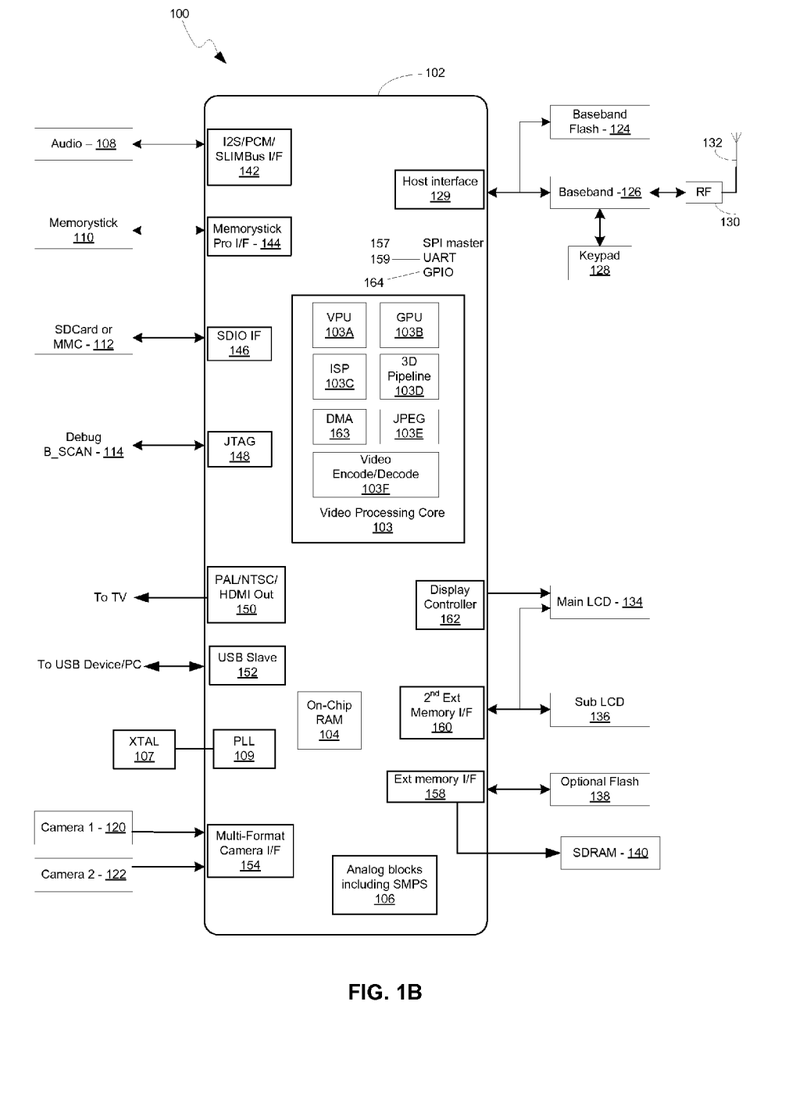
FIG. 1B is a block diagram of an exemplary mobile multimedia processor that utilizes a merge buffer in a virtual machine environment in a mobile multimedia system, in accordance with an embodiment of the invention.

FIG. 1B is a block diagram of an exemplary mobile multimedia processor that utilizes a merge buffer in a virtual machine environment in a mobile multimedia system, in accordance with an embodiment of the invention. Referring to FIG. 1B, the mobile multimedia processor 102 may comprise suitable logic, circuitry, interfaces, and/or code that may be operable to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103 that may comprise a graphic processing unit 103B, an image sensor pipeline (ISP) 103C, a 3D pipeline 103D, a direct memory access (DMA) controller 163, a joint photographic experts group (JPEG) encoding/decoding module 103E, and a video encoding/decoding module 103F. The mobile multimedia processor 102 may also comprise on-chip RAM 104, an analog block 106, a phase locked loop (PLL) 109, an audio interface (I/F) 142, a memory stick I/F 144, SD card I/F 146, JTAG I/F 148, TV output I/F 150, USB I/F 152, a camera I/F 154, and a host I/F 129. The mobile multimedia processor 102 may further comprise a serial peripheral interface (SPI) 157, a universal asynchronous receiver/transmitter (UART) I/F 159, general purpose input/output (GPIO) pins 164, a display controller 162, an external memory I/F 158, and a second external memory I/F 160.

The video processing core 103 may comprise suitable logic, circuitry, interfaces, and/or code that may be operable to perform video processing of data. The on-chip RAM 104 and the SDRAM 140 comprise suitable logic, circuitry and/or code that may be adapted to store data such as image or video data.

The image sensor pipeline (ISP) 103C may comprise suitable circuitry, logic and/or code that may be operable to process image data. The ISP 103C may perform a plurality of processing techniques comprising filtering, demosaic, lens shading correction, defective pixel correction, white balance, image compensation, Bayer interpolation, color transformation, and post filtering, for example. The processing of image data may be performed on variable sized tiles, reducing the memory requirements of the ISP 103C processes.

The GPU 103B may comprise suitable logic, circuitry, interfaces, and/or code that may be operable to offload graphics rendering from a general processor, such as the processor 101j, described with respect to FIG. 1A. The GPU 103B may be operable to perform mathematical operations specific to graphics processing, such as texture mapping and rendering polygons, for example.

The 3D pipeline 103D may comprise suitable circuitry, logic and/or code that may enable the rendering of 2D and 3D graphics. The 3D pipeline 103D may perform a plurality of processing techniques comprising vertex processing, rasterizing, early-Z culling, interpolation, texture lookups, pixel shading, depth test, stencil operations and color blend, for example.

The JPEG module 103E may comprise suitable logic, circuitry, interfaces, and/or code that may be operable to encode and/or decode JPEG images. JPEG processing may enable compressed storage of images without significant reduction in quality.

The video encoding/decoding module 103F may comprise suitable logic, circuitry, interfaces, and/or code that may be operable to encode and/or decode images, such as generating full 108p HD video from H.264 compressed data, for example. In addition, the video encoding/decoding module 103F may be operable to generate standard definition (SD) output signals, such as phase alternating line (PAL) and/or national television system committee (NTSC) formats.

The analog block 106 may comprise a switch mode power supply (SMPS) block and an on-chip SMPS controller, which may be adapted to generate its core voltage. The core voltage may be software programmable according to, for example, speed demands on the mobile multimedia processor 102, allowing further control of power management.

The PLL 109 may comprise suitable logic, circuitry, interfaces, and/or code that may be operable to generate suitable clock signals, 195 kHz-200 MHz clocks, for example, for external devices. A crystal, the XTAL 107, may be coupled to the PLL 109 and may comprise suitable logic, circuitry, interfaces, and/or code that may be operable to generate a stable oscillating signal for the PLL 109. Other voltages and clock speeds may be utilized depending on the type of application. The mobile multimedia processor 102 may comprise a plurality of power modes of operation, for example, run, sleep, hibernate and power down.

The audio block 108 may comprise suitable logic, circuitry, interfaces, and/or code that may be operable to communicate with the mobile multimedia processor 102 via an inter-IC sound ($I^2S$), pulse code modulation (PCM), serial low-power inter-chip media bus (SLIMBus), audio codec (AC'97) interface 142 or other suitable interface, for example. In the case of an AC'97 and/or an $I^2S$ interface, suitable audio controller, processor and/or circuitry may be operable to provide AC'97 and/or $I^2S$ audio output respectively, in either master or slave mode. In the case of the PCM interface, a suitable audio controller, processor and/or circuitry may be operable to allow input and output of telephony or high quality stereo audio. The PCM audio controller, processor and/or circuitry may comprise independent transmit and receive first in first out (FIFO) buffers and may use DMA to further reduce processor overhead. The audio block 108 may also comprise an audio in, audio out port and a speaker/microphone port (not illustrated in FIG. 1B).

The mobile multimedia device 100 may comprise at least one portable memory input/output (I/O) block. In this regard, the memorystick block 110 may comprise suitable logic, circuitry, interfaces, and/or code that may be operable to communicate with the mobile multimedia processor 102 via a memorystick pro interface 144, for example. The SD card block 112 may comprise suitable logic, circuitry, interfaces, and/or code that may be operable to communicate with the mobile multimedia processor 102 via a SD input/output (I/O) interface 146, for example. A multimedia card (MMC) may also be utilized to communicate with the mobile multimedia processor 102 via the SD input/output (I/O) interface 146, for example. The mobile multimedia device 100 may comprise other portable memory I/O blocks such an xD I/O card.

The debug block 114 may comprise suitable logic, circuitry, interfaces, and/or code that may be operable to communicate with the mobile multimedia processor 102 via a joint test action group (JTAG) interface 148, for example. The debug block 114 may be adapted to access the address space of the mobile multimedia processor 102 and may be adapted to perform boundary scan via an emulation interface. Other test access ports (TAPs) may be utilized. The phase alternate line (PAL)/national television standards committee (NTSC)/high definition multimedia interface (HDMI) TV output I/F 150 may be utilized for communication with a TV, and the universal serial bus (USB) 1.1, or other variant thereof, slave port I/F 152 may be utilized for communications with a PC, for example. The cameras 120 and/or 122 may comprise suitable logic, circuitry, interfaces, and/or code that may be operable to generate images and/or HD video and communicate with the mobile multimedia processor 102 via a multi-format raw/CCIR 601 camera interface 154, for example. The camera I/F 154 may also be used, for example, to connect the mobile multimedia processor 102 to a mobile TV front end.

The mobile multimedia processor 102 may also comprise a plurality of serial interfaces, such as the USB I/F 152, a serial peripheral interface (SPI) 157, and a universal asynchronous receiver/transmitter (UART) I/F 159 for Bluetooth or IrDA. The SPI master interface 157 may comprise suitable circuitry, logic, and/or code and may be utilized to control image sensors. Two chip selects may be provided, for example, and the interface may work in a polled mode with interrupts or via a DMA controller 163. In another embodiment of the invention, the interface may comprise an 120 serial interface, which may be used for camera control, for example. Furthermore, the mobile multimedia processor 102 may comprise a plurality of general purpose I/O (GPIO) pins 164, which may be utilized for user defined I/O or to connect to the internal peripherals. The display controller 162 may comprise suitable circuitry, logic, and/or code and may be adapted to support multiple displays with VGA, XGA, or HD resolution, for example, and to handle 8/9/16/18/24-bit video data.

The mobile multimedia processor 102 may be connected via an 8/16 bit parallel host interface 129 to the same bus as the baseband processing block 126 uses to access the baseband flash memory 124. The host interface 129 may be operable to provide two channels with independent address and data registers through which a host processor may read and/or write directly to the memory space of the mobile multimedia processor 102. The baseband processing block 126 may comprise suitable logic, circuitry, interfaces, and/or code that may be operable to convert RF signals to baseband and communicate the baseband processed signals to the mobile multimedia processor 102 via the host interface 129, for example. The RF processing block 130 may comprise suitable logic, circuitry, interfaces, and/or code that may be operable to receive signals via the antenna 132 and to communicate RF or IF signals to the baseband processing block 126. The host interface 129 may comprise a dual software channel with a power efficient bypass mode.

The main LCD 134 may be adapted to receive data from the mobile multimedia processor 102 via a display controller 162 and/or from a second external memory interface 160, for example. The display controller 162 may comprise suitable logic, circuitry and/or code and may be adapted to drive an internal TV out function or be connected to a range of LCD's. The display controller 162 may be adapted to support a range of screen buffer formats and may utilize direct memory access (DMA) to access the buffer directly and increase video processing efficiency of the video processing core 103. Both NTSC and PAL raster formats may be generated by the display controller 162 for driving the TV out. Other formats, for example SECAM, may also be supported.

The display controller 162 may recognize and communicate a display type to the DMA controller 163. In this regard, the DMA controller 163 may fetch video data in an interlaced or non-interlaced fashion for communication to an interlaced or non-interlaced display coupled to the mobile multimedia processor 102 via the display controller 162.

The subsidiary LCD 136 may comprise suitable logic, circuitry and/or code that may be adapted to communicate with the mobile multimedia processor 102 via a second external memory interface 160, for example. The subsidiary LCD 136 may be used on a clamshell phone where the main LCD 134 may be inside and the subsidiary LCD 136 may be outside, for example. The mobile multimedia processor 102 may comprise a RGB external data bus. The mobile multimedia processor 102 may be adapted to scale image output with pixel level interpolation and a configurable refresh rate.

The optional flash memory 138 may comprise suitable logic, circuitry, interfaces, and/or code that may be operable to communicate with the mobile multimedia processor 102 via an external memory interface 158, for example. The SDRAM 140 may comprise suitable logic, circuitry and/or code that may be adapted to receive data from the mobile multimedia processor 102 via the external memory interface 158, for example. The external memory UF 158 may be utilized by the mobile multimedia processor 102 to connect to the SDRAM 140, SRAM, Flash memory 138, and/or external peripherals, for example. Control and timing information for the SDRAM 140 and other asynchronous devices may be configurable by the mobile multimedia processor 102.

The mobile multimedia processor 102 may further comprise a secondary external memory interface 160 to connect to memory-mapped LCD and external peripherals, for example. The secondary external memory interface 160 may comprise suitable circuitry, logic, and/or code and may be utilized to connect the mobile multimedia processor 102 to slower devices without compromising the speed of external memory access. The secondary external memory interface 160 may provide 16 data lines, for example, 6 chip select/address lines, and programmable bus timing for setup, access and hold times, for example. The mobile multimedia processor 102 may be adapted to provide support for NAND/NOR Flash including NAND boot and high speed direct memory access (DMA), for example. The mobile multimedia processor 102 may be operable to store data in a merge buffer in a virtual machine environment, and enable the interaction/operation with the various functional layers, such as the virtual machine user layer, a native user layer, and kernel.

In operation, the mobile multimedia processor 102 may be adapted to receive images or video from external cameras, such as cameras 120 and/or 122, and process the images via the video processor 103, the ISP 103C and the 3D pipeline 103D. The video processing core 103 may be integrated on a chip and may be located in regions of the chip with different power vs. performance characteristics.

In an embodiment of the invention, the mobile multimedia processor 102 may be operable to operate within a virtual machine (VM) environment within an operating system, such as a Java or Microsoft common language runtime (CLR) environment. The VM environment may be configured by a processor, such as the processor 101j. In addition, the processor 101J may support a native user environment comprising application and library domains, which may interact with the VM environment. The native user domain may communicate with hardware within the processor 101j and the MMP 101a via a kernel remote procedure call (RPC) within the processor 101j operating system.

An application programming interface (API) such as open graphics library (GL) 3D may be utilized for video processing in the mobile multimedia processor 102, and accessed by the user domain. Communication between the VM environment and hardware via the kernel RPC may be costly in terms of latency, time, and power, for example. In an embodiment of the invention, commands to be communicated from the VM environment to hardware, such as the mobile multimedia processor 102, may be buffered in a merge buffer in the VM environment, such that commands may be communicated out of the buffer when full, or at a desired level, such that more efficient use of the kernel RPC may be enabled.

Figure 2:
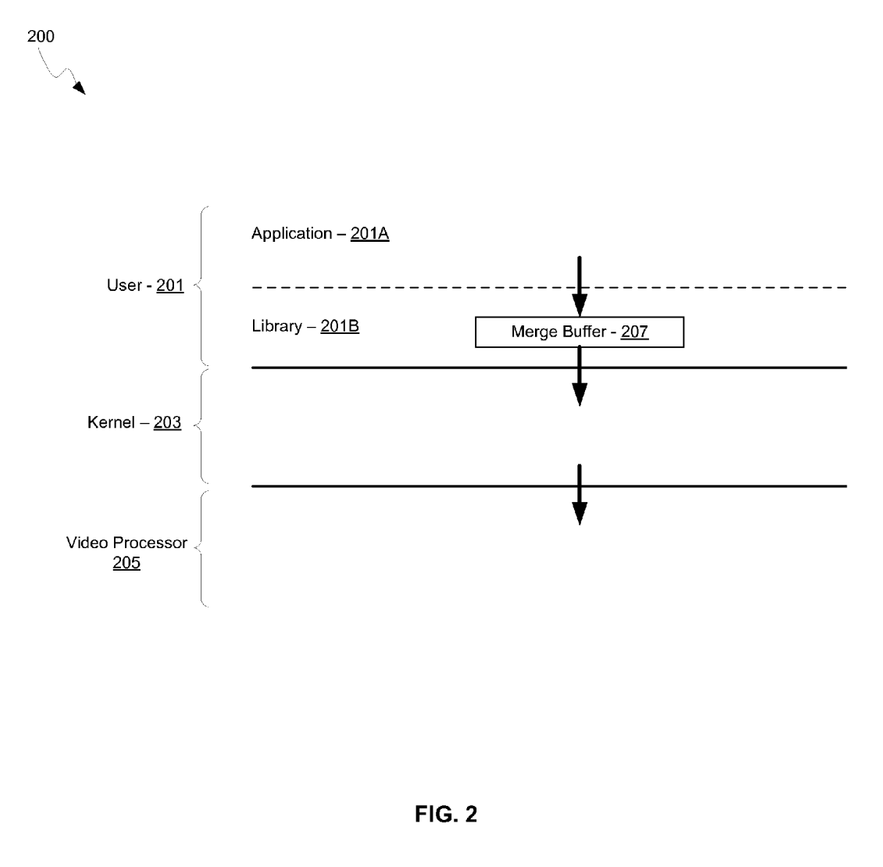
FIG. 2 is a block diagram of an exemplary hierarchy diagram for video processing applications in a mobile multimedia system, in accordance with an embodiment of the invention.

FIG. 2 is a block diagram of an exemplary hierarchy diagram for video processing applications in a mobile multimedia system, in accordance with an embodiment of the invention. Referring to FIG. 2, there is shown a user layer 201, a kernel 203, and a video processor 205. The user layer 201 may comprise an application layer 201A and a library layer 201B.

The user layer 201 may comprise suitable circuitry, logic, interfaces, and/or code that may be operable to receive and process user-requested tasks, via applications and libraries in the application layer 201A and the library layer 201B. The solid and dashed lines indicate interfaces that may be crossed when moving between layers, wherein the solid lines indicate a more "costly" transition in terms of time, power, and latency, for example, as they may involve the physical transmission of data between chips, such as from the processor 101j to a video processor on another chip such as the video processing core 103, for example.

The application layer 201A may comprise suitable circuitry, logic, interfaces, and/or code that may be operable to provide a user interface to applications operating within the user layer 201. The applications may be isolated from hardware such as the video processor 205 by the kernel 203. Accordingly, applications executing in the application layer 201A may be isolated from other running applications since they may not have direct access to hardware.

The library layer 201B may comprise suitable circuitry, logic, interfaces, and/or code that may be operable to manage the flow of data from the application layer 201A and the kernel 203. The library layer 201B may perform a user-to-kernel RPC, for example, in instances where requests/tasks are to be transmitted to the kernel 203.

The kernel 203 may comprise suitable circuitry, logic, interfaces, and/or code that may be operable to provide communication of data between the user layer 201 and the video processor 205. The kernel 203 may comprise a remote procedure call (RPC) that may enable communication between the library layer 201B and the kernel 203, and subsequently to the video processor 205. The kernel 203 may comprise the layer that interfaces with hardware, such as in the video processor 205, so that programs in the user layer 201 cannot harm other processes, as may happen if user applications were given direct hardware access.

The video processor 205 may comprise suitable circuitry, logic, interfaces, and/or code that may be operable to receive task requests from the kernel layer 203. The video processor 205 may represent processes that run on video processor hardware such as the video processing core 103, described in FIG. 1B. The video processor 205 may execute programs that utilize an application programming interface (API) such as open graphics library (GL) 3D.

The merge buffer 207 may comprise suitable circuitry, logic, interfaces, and/or code that may be operable to store function calls or other task requests to be communicated to the kernel 203.

In operation, one or more OpenGL 3D functions, such as a cull mode, GL front, for example, may be requested by an application or library in the user layer 201. The library layer 201B would conventionally perform a user to kernel RPC, but in an embodiment of the invention, due to the cost of crossing the boundary between the user layer 201 and the kernel 203, the requests may be stored in the merge buffer 207. The requests may be stored until the merge buffer is full or has reached a desired level. In this manner, the costly task of crossing the boundaries between the user layer 201 and the kernel 203 as well as between the kernel 203 and the video processor 205, may be minimized by reducing the number of crossings. In instances where the merge buffer 207 is full or has reached a predetermined level, an application programming interface (API) may be utilized to communicate the stored data to the kernel 203.

Figure 3:
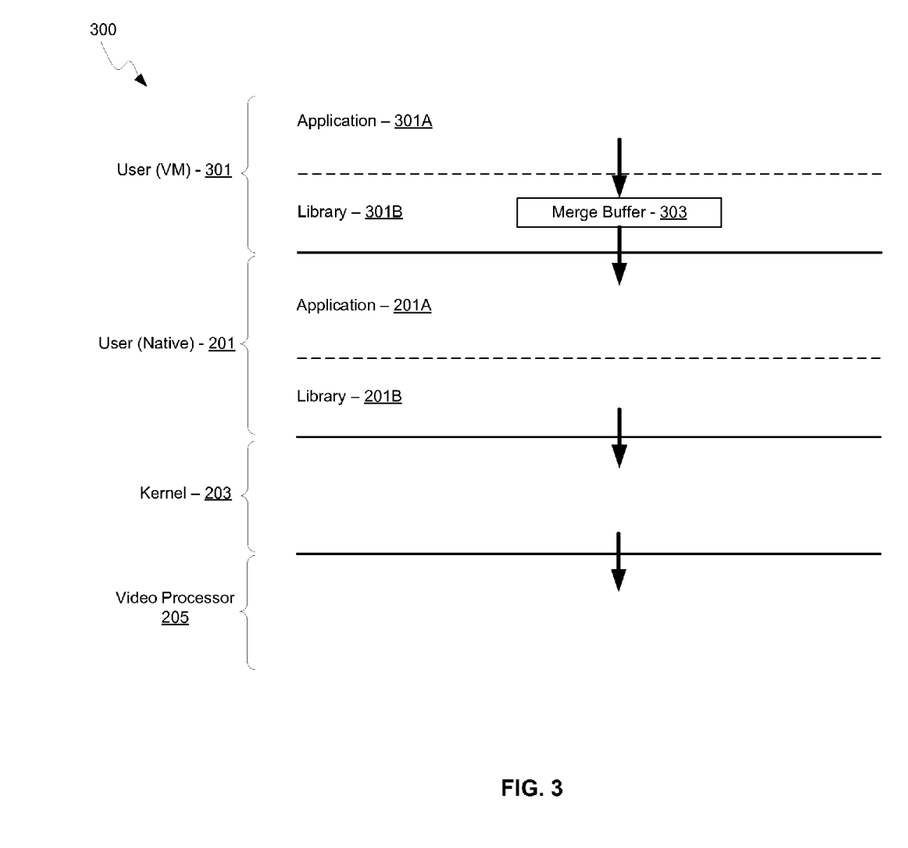
FIG. 3 is a block diagram of an exemplary hierarchy diagram for video processing applications with user and virtual machine layers in a mobile multimedia system, in accordance with an embodiment of the invention.

FIG. 3 is a block diagram of an exemplary hierarchy diagram for video processing applications with user and virtual machine layers in a mobile multimedia system, in accordance with an embodiment of the invention. Referring to FIG. 3, there is shown the application layer 201, the kernel 203, and the video processor 205, which may be as described with respect to FIG. 2. There is also shown a virtual machine (VM) user layer 301 comprising an application layer 301A, a library layer 301B, and a merge buffer 303.

The VM user layer 301 may comprise suitable circuitry, logic, interfaces, and/or code that may be operable to execute user applications in a VM environment. For example, the VM user layer 301 may operate in a Java, C Sharp, or other Java-like environment. The library layer 301B may be substantially similar to the library layer 201B, but operating under a VM environment.

The merge buffer 303 may be substantially similar to the merge buffer 207, but located in the VM environment of the library layer 301B.

In operation, the interface between the VM user layer 301 and the user layer 201 may be costly to cross in terms of time, power, and latency, for example. Accordingly, requests for hardware processing, such as in the video processor 205 and communicated from the VM application layer 301A, may be stored in the merge buffer 303. When the merge buffer 303 is full or filled to a desired level, the stored requests may be communicated to the user layer 201 and subsequently communicated to the video processor 205 via the kernel 203 using a user to kernel RPC.

Figure 4:
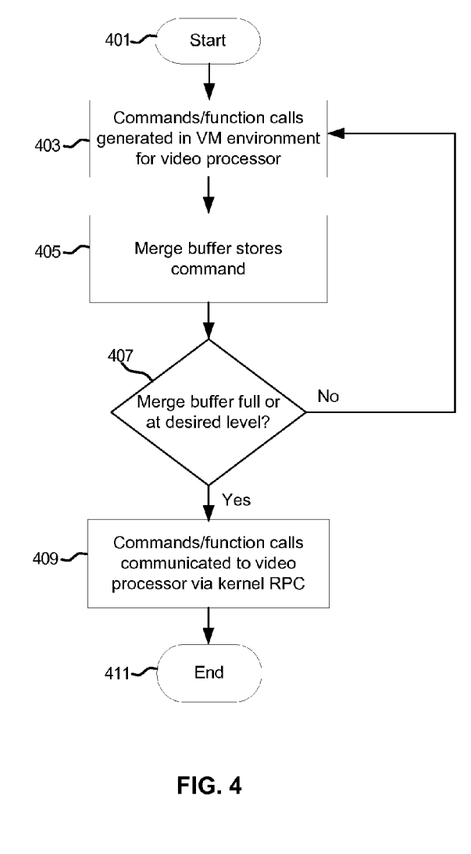
FIG. 4 is a block diagram of exemplary steps in a virtual machine merge buffer process in a mobile multimedia system, in accordance with an embodiment of the invention.

FIG. 4 is a block diagram of exemplary steps in a virtual machine merge buffer process in a mobile multimedia system, in accordance with an embodiment of the invention. Referring to FIG. 4, in step 403, after start step 401, commands in the VM user layer 301 may be generated by one or more applications in the VM application layer 301A. In step 405, the commands or function calls may be communicated to the merge buffer 303. In step 407, in instances where the merge buffer 303 is not full or at a suitably high level, the process may return to step 403, for the generation of more commands or function calls. In step 407, in instances where the merge buffer 303 is full, the exemplary steps may proceed to step 409 where the commands and/or function calls may be communicated to the video processor 205 via the user layer 201 and the kernel 203, followed by end step 411.

In an embodiment of the invention, a method and system are provided for reducing communication during video processing utilizing merge buffering and may comprise storing data in a merge buffer 207/303 in a virtual machine user layer 301 in a wireless communication device 105. The wireless communication device 105 may comprise the virtual machine user layer 301, a native user layer 201, a kernel 203, and a video processor 103/205. The stored data may be communicated to the kernel 203 via the native user layer 201. The stored data may be communicated to the kernel utilizing function calls, and/or kernel remote procedure calls. An application programming interface may be utilized to communicate the stored data to the kernel. Video data may be processed by the video processor 103/205 based on the communicated data. The virtual machine user layer 301 may comprise a Java environment. The data may be communicated to the kernel 203 via the native user layer 201 when the merge buffer 207/303 is full or reaches a dynamically or statically determined level.

Certain embodiments of the invention may comprise a machine-readable storage having stored thereon, a computer program having at least one code section for reducing communication during video processing utilizing merge buffering, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for data processing, the method comprising:
in a wireless communication device comprising a virtual machine user layer, a native user layer, a kernel, and a video processor, wherein the virtual machine user layer communicates with the video processor via the native user layer, and the native user layer communicates with the video processor via the kernel:
storing data in a first merge buffer allocated in the virtual machine user layer comprising a virtual machine user application layer, the data comprising stored requests for hardware processing;
communicating the data, stored in the first merge buffer of the virtual machine user layer, to the kernel via a second merge buffer in the native user layer when said first merge buffer in said virtual machine layer is filled to a first predetermined level;
storing the data in the second merge buffer allocated in the native user layer comprising a native user application layer; and
communicating the data in the second merge buffer of the native user layer to the video processor via a kernel remote procedure call in response to the second merge buffer of the native user layer being filled to a second predetermined level.

2. The method according to claim 1, comprising communicating said data via an application programming interface.

3. The method according to claim 1, comprising processing video data in said video processor based on said communicated data.

4. The method according to claim 1, comprising communicating said data from said merge buffer in said virtual machine layer to said merge buffer in said native user layer when said merge buffer in said virtual machine layer is full.

5. The method of claim 1 wherein the virtual machine user layer comprises a virtual machine user library layer, the virtual machine user library layer comprising the merge buffer.

6. The method of claim 1, wherein the data is converted into a format used by the video processor prior to communicating the data stored in the merge buffer of the native user layer to the video processor.

7. A system for processing images, the system comprising:
one or more circuits in a wireless communication device comprising a virtual machine user layer, a native user layer, a kernel, and a video processor, wherein the virtual machine user layer communicates with the video processor via the native user layer, and the native user layer communicates with the video processor via the kernel, and said one or more circuits are operable to:
store data, from an application in said virtual machine layer comprising a virtual machine user application layer, in a first merge buffer in said virtual machine layer;
trigger transmission of contents of the first merge buffer in the virtual machine layer to the native user layer in response to said first merge buffer being filled to a first predetermined level;
store the transmitted contents in said native user layer in a second merge buffer in said native user layer comprising a native user application layer;
trigger transmission of contents of the second merge buffer in the native user layer to the kernel in response to said second merge buffer being filled to a second predetermined level; and
communicating the data in the second merge buffer of the native user layer to the video processor via a kernel remote procedure call.

8. The system according to claim 7, wherein said one or more circuits are operable to communicate said data utilizing function calls.

9. The system according to claim 8, wherein said function calls comprise kernel remote procedure calls.

10. The system according to claim 7, wherein said one or more circuits are operable to communicate said data via an application programming interface.

11. The system according to claim 7, wherein said one or more circuits are operable to process video data in said video processor based on said communicated data.

12. The system according to claim 7, wherein said virtual machine user layer comprises a Java environment.

13. The system according to claim 7, wherein said one or more circuits are operable to communicate said data to said kernel via said native user layer when said first merge buffer is full.

14. The system according to claim 7, wherein said one or more circuits are operable to communicate said data from said second merge buffer to said kernel via said native user layer when said first merge buffer is filled to a predetermined level.

15. The system of claim 7, wherein said one or more circuits are operable to: trigger transmission of contents of the second merge buffer in the native user layer to the kernel in response to said first merge buffer being filled to the first predetermined level.

16. A non-transitory machine-readable storage having stored thereon, a computer program having at least one code section for processing audio signals, the at least one code section being executable by a machine for causing the machine to perform steps comprising:
in a wireless communication device comprising a virtual machine user layer, a native user layer, a kernel, and a video processor, wherein the virtual machine user layer communicates with the video processor via the native user layer, and the native user layer communicates with the video processor via the kernel:
storing data in a first merge buffer in said virtual machine user layer comprising a virtual machine user application layer, the data comprising requests by an application executing in said virtual machine user layer, the requests for hardware processing by said video processor;
communicating said requests from said first merge buffer to said native user layer comprising a native user application layer when said first merge buffer in said virtual machine layer is filled to a first predetermined level, wherein said requests are stored in a second merge buffer in said native user layer; and
converting said requests from said second merge buffer into a format used by said video processor and communicating said converted requests to the video processor via the kernel using a user-to-kernel remote procedure call in response to the second merge buffer of the native user layer being filled to a second predetermined level.

17. The non-transitory machine readable storage according to claim 16, wherein said at least one code section comprises code for processing video data in said video processor based on said communicated data.

18. The non-transitory machine readable storage according to claim 16, wherein said virtual machine user layer comprises a Java environment.

19. The non-transitory machine readable storage according to claim 16, wherein said at least one code section comprises code for communicating said data to said kernel via said native user layer when said first merge buffer is full.

20. The non-transitory machine readable storage according to claim 16, wherein said at least one code section comprises code for communicating said data from said first merge buffer to said kernel via said native user layer when said first merge buffer is filled to a predetermined level.

21. A method for data processing, the method comprising:
in a wireless communication device comprising a virtual machine user layer, a native user layer, a kernel, and a video processor, wherein the virtual machine user layer communicates with the video processor via the native user layer, and the native user layer communicates with the video processor via the kernel:
storing data in a first merge buffer in the virtual machine user layer, the virtual machine user layer comprising a virtual machine user application layer;
communicating the data from a first merge buffer in the virtual machine layer to the native user layer, the native user layer comprising a native user application layer, wherein the virtual machine user layer communicates the data to the native user layer in response to the first merge buffer being filled to a first predetermined level; and
communicating the data from the second merge buffer in the native user layer to the kernel for being processed by the video processor and converting said data from said second merge buffer into a format used by said video processor and communicating said converted requests to the video processor via the kernel using a user-to-kernel remote procedure call, wherein the native user layer communicates the data in response to the second merge buffer being filled to a second predetermined level.

22. The method according to claim 21, comprising communicating said data to said kernel via said native user layer when said first merge buffer is full.

23. The method of claim 21 wherein the virtual machine user layer comprises a virtual machine user library layer, the virtual machine user library layer comprising the first merge buffer.

24. The method of claim 21, wherein the virtual machine user layer is operable to pack function arguments into the first merge buffer for virtual machine user layer functions.

25. The method of claim 21, wherein the virtual machine user layer is operable to trigger transmission of the first merge buffer to the native user layer and subsequently to the kernel and the video processor.

26. The method of claim 21, wherein the virtual machine user layer is operable to retrieve a return value from the video processor via the kernel and the native user layer.

27. The method of claim 26, wherein the virtual machine user layer is operable to store virtual machine user layer parameters in first the merge buffer which are used when processing calls in the virtual machine user layer.

* * * * *